(12) United States Patent
Kim (10) Patent No.: US 12,325,475 B2
(45) Date of Patent: Jun. 10, 2025

(54) POWER STEERING CONTROL SYSTEM WITH REDUNDANT STRUCTURE AND CONTROL METHOD THEREOF

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/388,276

(22) Filed: Nov. 9, 2023

(65) Prior Publication Data

US 2024/0166255 A1 May 23, 2024

(30) Foreign Application Priority Data

Nov. 18, 2022 (KR) .................. 10-2022-0155452

(51) Int. Cl.
  *B62D 5/04* (2006.01)
  *B60W 10/20* (2006.01)

(52) U.S. Cl.
  CPC ............. *B62D 5/046* (2013.01); *B60W 10/20* (2013.01)

(58) Field of Classification Search
  CPC ...... B62D 5/046; B62D 5/0403; B62D 6/002; B62D 5/0493; B60W 10/20; B60Y 2306/13

USPC .......................................................... 701/41
See application file for complete search history.

(56) References Cited

U.S. PATENT DOCUMENTS

2012/0265404 A1* 10/2012 Kim ..................... B62D 6/002
  701/43
2019/0291775 A1* 9/2019 Taki ..................... B62D 5/0484

FOREIGN PATENT DOCUMENTS

KR   10-2021-0112539 A   9/2021

* cited by examiner

*Primary Examiner* — Yi-Kai Wang
(74) *Attorney, Agent, or Firm* — Morgan, Lewis & Bockius LLP (57) ABSTRACT

Disclosed herein are a power steering control system with redundant structure and a control method thereof. The power steering control system is configured with a redundant structure for driving control of an autonomous vehicle, the first steering device and second steering device of the redundant power steering control system transmit signals to each other to average command values, and in particular, the speed controllers thereof transmit signals to each other to average them and perform speed control. Accordingly, it is possible to perform accurate position control and stably control driving by ensuring that the redundant power steering control system reduces an error in control signals. In addition, it is possible to improve driving stability by controlling driving normally even if one of the steering devices fails.

11 Claims, 5 Drawing Sheets

POWER STEERING CONTROL SYSTEM WITH REDUNDANT STRUCTURE AND CONTROL METHOD THEREOF

CROSS-REFERENCE TO RELATED APPLICATION

This application claims priority from and the benefit of Korean Patent Application No. 10-2022-0155452, filed on Nov. 18, 2022, which is hereby incorporated by reference for all purposes as if set forth herein.

BACKGROUND

Field

Exemplary embodiments of the present disclosure relate to a power steering control system with redundant structure and a control method thereof, and more particularly, to a power steering control system, which is configured with a redundant structure to ensure safety of an autonomous vehicle and controls a driving direction of the vehicle, and a method of operating the same.

Discussion of the Background

In general, a motor-driven power steering (MDPS) system uses an electric motor to provide auxiliary torque in a direction steered by a driver for easy handling.

Unlike an existing hydraulic power steering (HPS) system, the motor-driven power steering system can improve steering performance and steering feel by automatically controlling the operation of the electric motor according to the driving condition of the vehicle.

The motor-driven power steering system includes a torque sensor to measure a driver's steering torque input to a steering wheel, a steering angle sensor to measure a steering angle of the steering wheel, a vehicle speed sensor to measure a vehicle speed, and the like in order to determine the driving condition of the vehicle.

Meanwhile, in an autonomous vehicle capable of traveling without driver intervention, the motor-driven power steering system is not simply to assist the driver, but to control the direction of the vehicle based on the measured data.

The autonomous vehicle is required to detect and avoid obstacles therearound and to travel along lanes so as not to collide with vehicles ahead.

There is a need to reduce an error which may occur between a command steering angle and an actual controlled steering angle while the motor-driven power steering system controls the driving of the autonomous vehicle according to the command steering angle.

As such, the motor-driven power steering system is a major system that greatly affects the steering safety of the vehicle, and the reliability and safety of the motor-driven power steering system are essential elements for the safe operation of the vehicle.

In addition, if an error occurs in the motor-driven power steering system, the vehicle becomes unable to travel. Therefore, the motor-driven power steering system must be configured with a redundant structure for more stable autonomous driving.

The related art of the present disclosure is disclosed in Korean Patent Application Publication No. 10-2021-0112539 entitled "MOTOR-DRIVEN POWER STEERING SYSTEM WITH REDUNDANT STRUCTURE".

SUMMARY

Various embodiments are directed to a power steering control system, which is configured with a redundant structure for driving control of an autonomous vehicle and stably controls a driving direction of the vehicle by reducing an error in control signals through the redundant structure, and a control method thereof.

In an embodiment, there is provided a power steering control system with redundant structure, which includes a first position controller configured to output a first speed command value in response to a command steering angle, a first speed controller configured to output a first current command value in response to the first speed command value, a first current controller configured to output a first current control signal for controlling a steering motor in response to the first current command value, a second position controller configured to output a second speed command value in response to a command steering angle, a second speed controller configured to output a second current command value in response to the second speed command value, a second current controller configured to output a second current control signal for controlling the steering motor in response to the second current command value, and the steering motor configured to control a driving direction by driving in response to the first current control signal and the second current control signal applied to a motor rotary shaft.

The first position controller and the second position controller may transmit the command steering angles to each other to average them, and then calculate the first speed command value and the second speed command value, respectively.

The first current controller and the second current controller may transmit the first current command value and the second current command value to each other to average them, and then calculate the first current control signal and the second current control signal.

The first speed controller and the second speed controller may calculate respective signals for speed control in response to the first speed command value and the second speed command value according to an averaging algorithm, and then transmit the signals for speed control to each other to average them and control a cumulative error.

The first speed controller and the second speed controller may transmit signals for speed control to each other to average them to be reflected in speed control, and transmit the averaged signal again.

The first speed controller and the second speed controller may be based on a sampling period, a difference between a command speed and a feedback speed, and an integral control gain, and output the signals for speed control by multiplying the difference between the command speed and the feedback speed by the sampling period, multiplying the multiplied result by the integral control gain, and then accumulating the same.

The first speed controller may be configured to calculate a first signal for speed control in response to the first speed command value and transmit the first signal to the second speed controller, to perform speed control by computing a first average value, which is an average value of the first signal and a second signal received from the second speed controller, and computing an average of the first signal and the first average value to calculate a third signal, and to transmit the third signal to the second speed controller.

The second speed controller may be configured to calculate a second signal for speed control in response to the second speed command value and transmit the second signal to the first speed controller, to perform speed control by computing a second average value, which is an average value of the second signal and the third signal received from the first speed controller, and computing an average of the second signal and the second average value to calculate a fourth signal, and to transmit the fourth signal to the first speed controller.

In another embodiment, there is provided a method of controlling a power steering control system with redundant structure, which includes outputting, by a first position controller, a first speed command value in response to a command steering angle, outputting, by a second position controller, a second speed command value in response to a command steering angle, outputting, by a first speed controller, a first current command value in response to the first speed command value, outputting, by a second speed controller, a second current command value in response to the second speed command value, outputting, by a first current controller, a first current control signal for controlling a steering motor in response to the first current command value, outputting, by a second current controller, a second current control signal for controlling the steering motor in response to the second current command value, and controlling a driving direction by applying the first current control signal and the second current control signal to a rotary shaft of the steering motor.

The method may further include transmitting the command steering angles to each other to average the command steering angles by the first position controller and the second position controller, and the speed command values may be calculated in response to the averaged command steering angle.

The method may further include transmitting the first current command value and the second current command value to each other by the first current controller and the second current controller, and calculating an average of the first current command value and the second current command value, and the current control signals may be output in response to the averaged current command value.

The first speed controller may be configured to generate a first signal for speed control in response to the first speed command value received from the first position controller, to receive a second signal for speed control from the second speed controller, to calculate a first average value by computing an average of the first signal and the second signal, to calculate a third signal by computing an average of the first signal and the first average value, to transmit the third signal to the second speed controller, and to perform speed control in response to the third signal and output the first current command value.

The second speed controller may be configured to generate the second signal for speed control in response to the second speed command value, to transmit the second signal to the first speed controller, to receive the third signal from the first speed controller, to perform speed control by computing a second average value, which is an average value of the second signal and the third signal, and computing an average of the second signal and the second average value to calculate a fourth signal, to transmit the fourth signal to the first speed controller, and to perform speed control in response to the fourth signal and output the second current command value.

As apparent from the above description, according to the power steering control system with redundant structure and the control method thereof of the present disclosure, it is possible to perform accurate position control and stably control driving by ensuring that the redundant power steering control system reduces an error in control signals.

In addition, the present disclosure can improve driving stability by controlling driving normally through the redundancy of the power steering control system even if one of the steering devices fails.

DETAILED DESCRIPTION OF THE ILLUSTRATED EMBODIMENTS

Exemplary embodiments of the present disclosure will be described below with reference to the accompanying drawings.

It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

Figure 1:
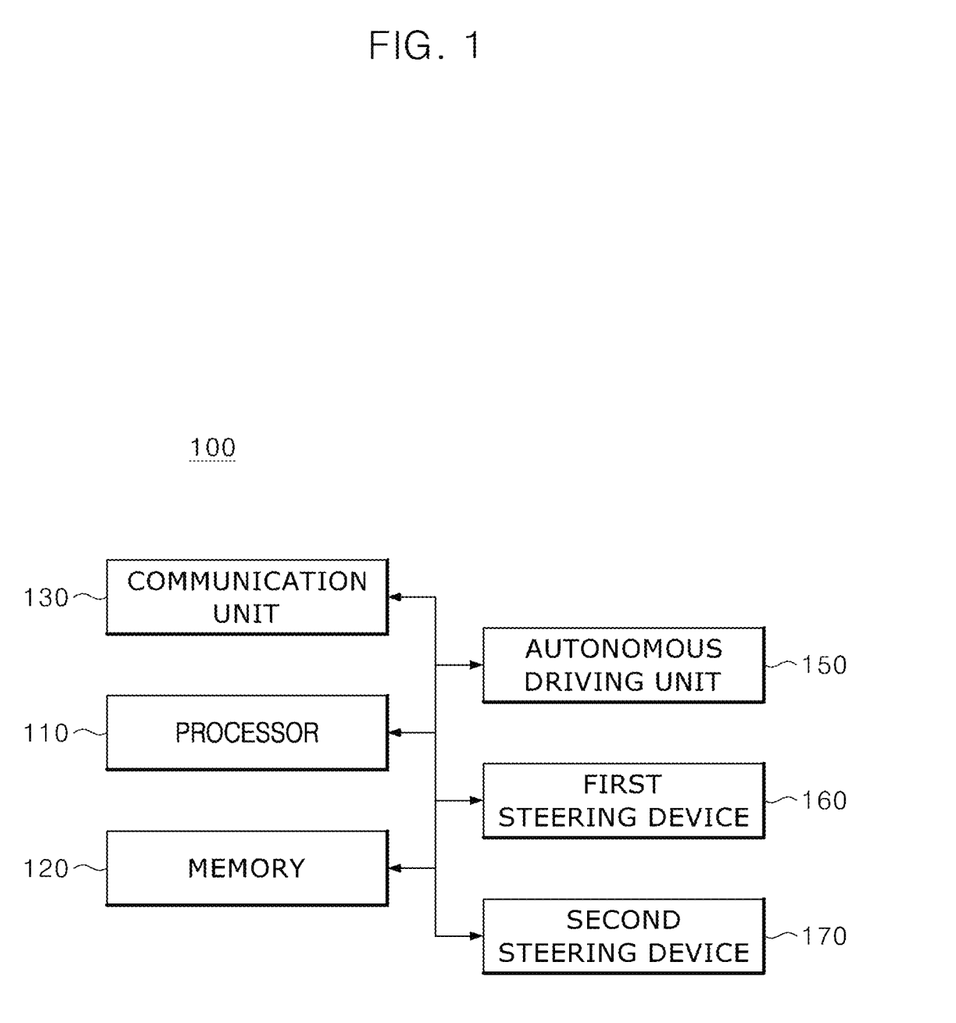
FIG. 1 is a block diagram schematically illustrating a configuration of a vehicle including a power steering control system with redundant structure according to an embodiment of the present disclosure.

FIG. 1 is a block diagram schematically illustrating a configuration of a vehicle including a power steering control system with redundant structure according to an embodiment of the present disclosure.

As illustrated in FIG. 1, the vehicle, which is designated by reference numeral 100, includes a communication unit 130, a memory 120, an ECU 110, and an autonomous driving unit 150. The power steering control system of the vehicle 100 is configured with a redundant structure and includes a first steering device 160 and a second steering device 170.

In some cases, the autonomous driving unit 150 of the vehicle 100 may also be configured with a redundant structure.

The memory 120 stores data measured by a plurality of sensors (not shown) and data transmitted and received through the communication unit 130, and stores computational data during the operation of the ECU 110 and the autonomous driving unit 150.

The memory 120 stores a control algorithm of the ECU 110, a driving control algorithm of the autonomous driving unit 150, and steering control algorithms of the first steering device 160 and the second steering device 170.

Examples of the memory 120 include storage means, for example, non-volatile memory such as random access memory (RAM), ROM, and electrically erased programmable ROM (EEPROM), and flash memory.

The communication unit 130 allows the ECU 110 and each component of the vehicle (e.g., autonomous driving unit) to transmit and receive data with respect to each other. The communication unit 130 includes a driver for controller area network (CAN) communication or a driver for local interconnect network (LIN) communication for data transmission and reception.

The communication unit 130 may include a wired or wireless communication module for communication with a user's portable terminal. For example, the communication unit 130 includes at least one of short-range communication such as Ethernet, WIFI, and Bluetooth, mobile communication, and serial communication.

The ECU 110 monitors and controls the overall operation of the vehicle, for example, the starting, braking, and motor driving of the vehicle 100. The ECU 110 controls a driving speed and sets a driving path by recognizing surrounding objects based on the data input from the plurality of sensors.

The ECU 110, the autonomous driving unit 150, the first steering device 160, and the second steering device 170 may each include at least one microprocessor.

The autonomous driving unit 150 controls a driving direction in which the vehicle 100 travels along the driving path set by the ECU 110.

The autonomous driving unit 150 calculates command steering angles for controlling the driving direction and applies the calculated command steering angles to the steering devices.

The autonomous driving unit 150 applies the command steering angles to the first steering device 160 and the second steering device 170. In some cases, if the autonomous driving unit 150 consists of a first autonomous driving unit and a second autonomous driving unit, the first autonomous driving unit may apply a command steering angle to the first steering device 160 and the second autonomous driving unit may apply a command steering angle to the second steering device 170.

The first steering device 160 and the second steering device 170 control a steering motor (not shown) in response to the command steering angles input thereto and allow the direction of the wheels of the vehicle to change accordingly.

The first steering device 160 and the second steering device 170 are connected to one steering motor.

The first and second steering devices 160 and 170 have respective windings connected to the motor rotary shaft of the steering motor for application of current control signals.

In this case, the steering motor rotates based on the sum of the control values of the current control signal of the first steering device 160 and the current control signal of the second steering device 170.

The first steering device 160 and the second steering device 170 perform steering control independently, and transmit and receive data with respect to each other to prevent the difference in control signals from increasing beyond a certain value.

The first steering device 160 and the second steering device 170 transmit control signals generated during steering control to each other to average the control signals, and perform control in response to the averaged signals to reduce errors.

If one of the first steering device 160 and the second steering device 170 is abnormal, the other operating normally controls the driving direction.

Figure 2:
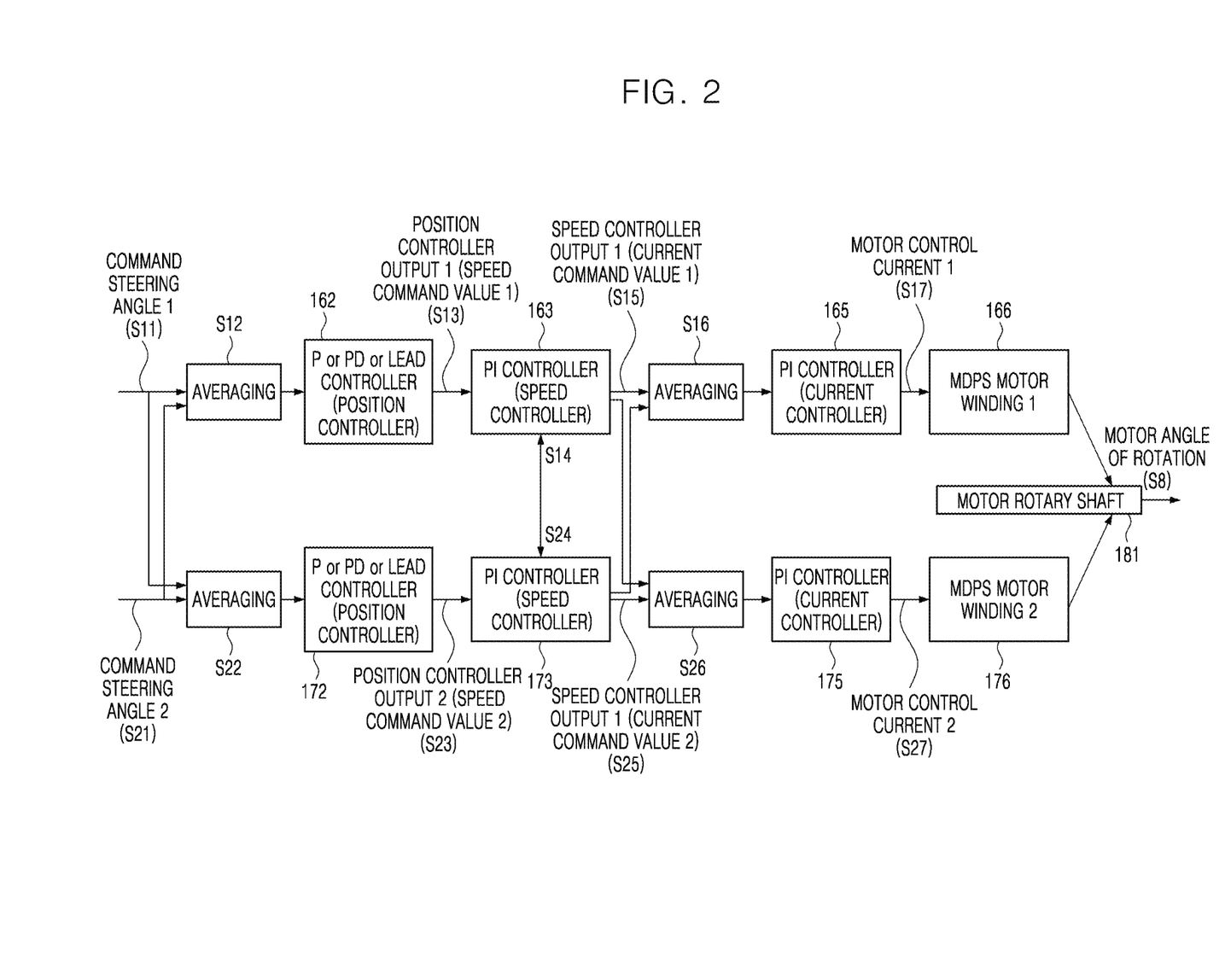
FIG. 2 is a block diagram schematically illustrating a configuration and signal flow of the power steering control system with redundant structure according to the embodiment of the present disclosure.

FIG. 2 is a block diagram schematically illustrating a configuration and signal flow of the power steering control system with redundant structure according to the embodiment of the present disclosure.

The first steering device 160 and the second steering device 170 each drive the steering motor in response to the command steering angle of the autonomous driving unit 150 and control the direction of the wheels accordingly.

The first steering device 160 includes a first position controller 162, a first speed controller 163, and a first current controller 165.

In addition, the first steering device 160 includes a motor winding 166 connected to the steering motor (MDPS motor) to apply a signal to the motor rotary shaft in response to the first current control signal of the first current controller 165.

The second steering device 170 includes a second position controller 172, a second speed controller 173, and a second current controller 175.

In addition, the second steering device 170 includes a motor winding 176 connected to the steering motor (MDPS motor) to apply a signal to the motor rotary shaft in response to the second current control signal of the second current controller 175.

The first steering device 160 and the second steering device 170 control the motor rotary shaft 181 and drive the steering motor (MDPS motor) by applying the current control signals through the motor windings, respectively.

The driving direction of the vehicle 100 is changed by operating a rack and pinion connected to each wheel according to the angle of rotation of the motor rotation shaft 181.

The present disclosure is explained using MDPS as an example, but is also applicable to other types of power steering systems.

The first steering device 160 and the second steering device 170 transmit signals to each other to average them, and perform steering control based on the averaged signal.

The first position controller 162 and the second position controller 172 receive the command steering angles from the autonomous driving unit 150, respectively (S11) (S21).

The first position controller 162 transmits the received command steering angle to the second position controller 172, averages the command steering angle of the autonomous driving unit 150 and the received command steering angle (S12), and performs position control in response to the averaged command steering angle.

The second position controller 172 transmits the received command steering angle to the first position controller 162, averages the command steering angle received from the autonomous driving unit 150 and the command steering angle received from the first position controller 162 (S22), and perform position control in response to the averaged command steering angle.

The position controller may be at least one of a P controller (proportional control), a PD controller (proportional and differential control), and a LEAD controller.

The first position controller 162 outputs a first speed command value (S13). The second position controller 172 outputs a second speed command value (S23).

The first speed controller 163 outputs a first current command value in response to the first speed command value output from the first position controller 162 (S13). The second speed controller 173 outputs a second current command value in response to the second speed command value output from the second position controller 172 (S23).

In this case, the first speed controller 163 and the second speed controller 173, in outputting the current command values in response to the speed command values, generate and transmit and receive signals for mutual speed control according to an average algorithm, average the signals (S14) (S24), and then output the current command values based on the averaged signal for speed control (S15) (S25).

The speed controller may be a PI controller.

The first current controller 165 transmits the first current command value, which is an output value of the first speed controller 163, to the first current controller 165 and receives the second current command value from the second current controller 175, to calculate the average of the first current command value and the second current command value (S16).

The second current controller 175 transmits the second current command value, which is an output value of the second speed controller 173, to the first current controller 165 and receives the first current command value from the first current controller 165, to calculate the average of the first current command value and the second current command value (S26).

The first current controller 165 receives the averaged current command value and outputs a first current control signal for controlling the steering motor (MDPS motor) (S17).

The second current controller 175 receives the averaged current command value and outputs a second current control signal for controlling the steering motor (MDPS motor) (S27).

The first current control signal and the second current control signal are applied to the motor rotary shaft 181 by the winding 166 of the MDPS motor and the winding 176 of the MDPS motor, and the motor operates at a constant angle of rotation (S8).

Accordingly, the first steering device 160 and the second steering device 170 operate independently in response to the command steering angles input thereto, and control the rotational position of the motor by transmitting control signals to each other and averaging them to thereby reduce the difference between the control signals.

The first steering device 160 and the second steering device 170 average the command steering angles and current command values, respectively, and the speed controllers also transmit and receive signals with respect to each other and average them. Thus, the first steering device 160 and the second steering device 170 may be controlled so that the signals thereof do not exceed a certain value.

The signal processing process of the first speed controller 163 and the second speed controller 173 is as follows.

$$Yi = \frac{1}{s} \times Ki \times \text{error} \qquad \text{[Equation 1]}$$

Each speed controller processes signals according to Equation 1. In this case, if the integral equation is Laplace transformed, the target function to be integrated may be defined as 1/s. s=A+iB is a complex number, and may be expressed as an exponential function with a constant e.

The correlation between s and z may be expressed in Equation 2 using backward transform as follows.

$$s = \frac{1 - z^{-1}}{Ts} \qquad \text{[Equation 2]}$$

$$Ts \times \text{error} \times Ki = Yi - Yiz^{-1} \qquad \text{[Equation 3]}$$

When changing to the z domain, the integral control is as shown in Equation 3.

Ts is the sampling period, error is the difference between the command speed and the feedback speed, Ki is the integral control gain, and Yi is the integral control output.

The speed controller multiplies the error amount of the command speed and the feedback speed by the Ki value, which is a constant gain, and accumulates it to generate an output.

In order to discretize the same for actual embedded control, it is necessary to change from the s domain to the z domain, and the equation when changing the domain is shown in Equation 4 as follows.

$$Ts.1 \times \text{error}.1 \times Ki + h \ Yiz^{-1}.1 = Yi.1$$

$$Ts.2 \times \text{error}.2 \times Ki + h \ Yiz^{-1}.2 = Yi.2 \qquad \text{[Equation 4]}$$

They are the integral control output of the first steering device and the integral control output of the second steering device, respectively.

0.1 and 0.2 distinguish between the data of the first speed controller and the data of the second speed controller, respectively. That is, Ts.1 is the data of the first speed controller, Ts.2 is the data of the second speed controller, error.1 is the error of the first speed controller, and error.2 is the error of the second speed controller.

Here, the parts that cause divergence as the feedback value of each output continues to accumulate are $Yiz^{-1}$ 0.1 and $Yiz^{-1}$ 0.2.

If they are transmitted through internal communication, the values continue to diverge, resulting in an overflow of the variable and an error in position control.

Accordingly, the first steering device 160 and the second steering device 170 transmit the average value of $Yiz^{-1}$ 0.1 and $Yiz^{-1}$ 0.2 to each other through internal communication and control them in the speed controllers.

The first speed controller 163 transmits the value of $Yiz^{-1}$ 0.1 to the second speed controller 173, and the second speed controller 173 transmits the value of $Yiz^{-1}$ 0.2 to the first speed controller 163. Accordingly, both the first speed controller 163 and the second speed controller 173 repeat computing ($Yiz^{-1}$ 0.1+$Yiz^{-1}$ 0.2)*0.5 and then sharing the above value again through internal communication.

The first steering device 160 and the second steering device 170 continuously compute the values of $Yiz^{-1}$ 0.1 and $Yiz^{-1}$ 0.2, obtain ($Yiz^{-1}$ 0.1+$Yiz^{-1}$ 0.2)*0.5, and then repeat the process of replacing the same with a certain variable, receiving the same from each other through internal communication, and applying the same to the next control. Thus, the first steering device 160 and the second steering device 170 prevent the control signals from diverging by eliminating cumulative errors.

Accordingly, each speed controller processes signals as shown in the following Equation 5.

$$Ts.1 \times \text{error}.1 \times Ki + (Yiz^{-1}0.1 + Yiz^{-1}0.2) \times 0.5 = Yi.1.\text{Final}$$

$$Ts.2 \times \text{error}.2 \times Ki + (Yiz^{-1}0.1 + Yiz^{-1}0.2) \times 0.5 = Yi.2.\text{Final} \qquad \text{[Equation 5]}$$

Figure 3:
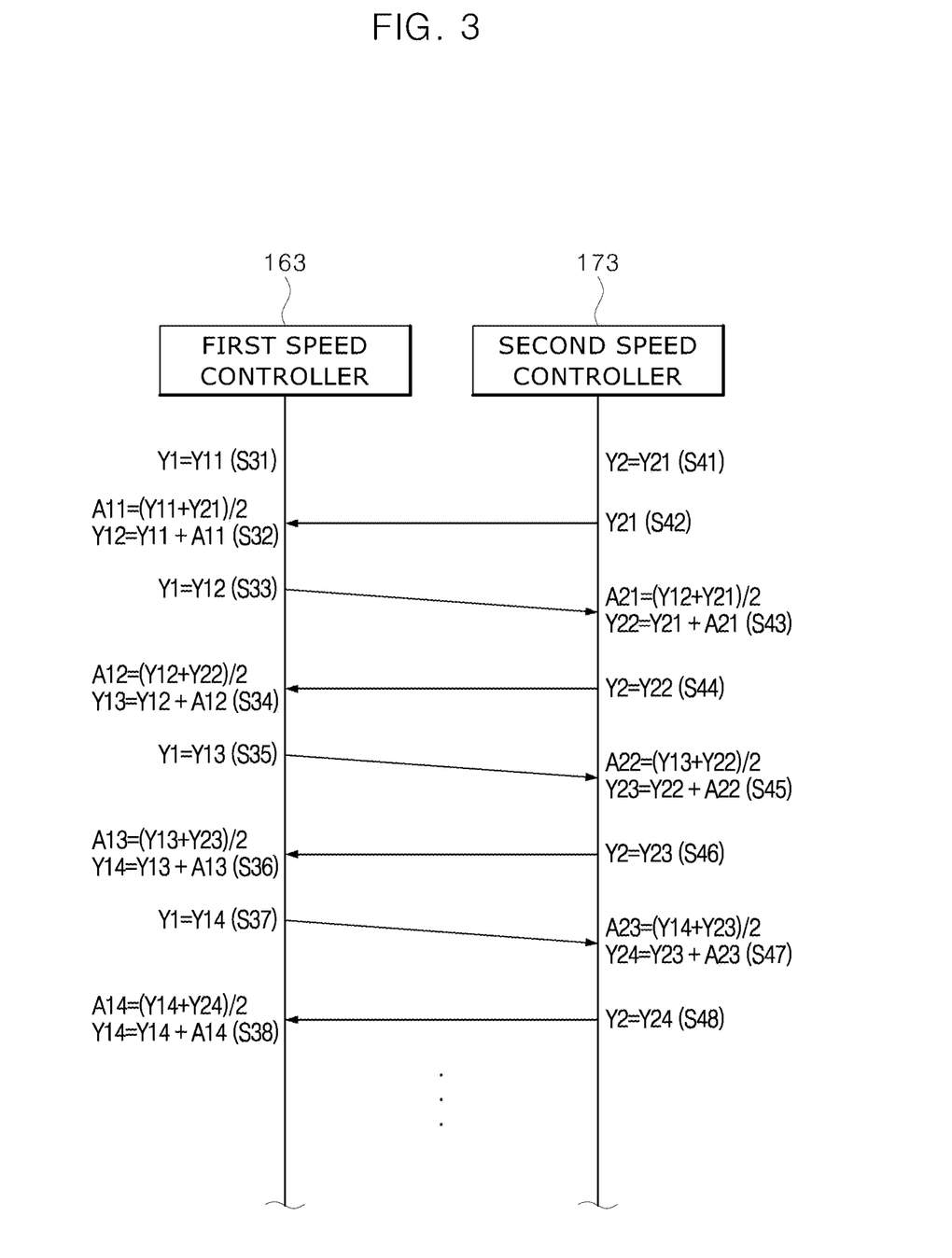
FIG. 3 is a flow diagram illustrating a process of averaging control signals of the power steering control system with redundant structure according to the embodiment of the present disclosure.

FIG. 3 is a flow diagram illustrating a process of averaging control signals of the power steering control system with redundant structure according to the embodiment of the present disclosure.

The first speed controller 163 and the second speed controller 173 transmit signals to each other, average the signals according to an averaging algorithm, and output current command values. The first speed controller 163 and the second speed controller 173 transmit signals to each other and repeat the process of transmitting the computed signals and averaging them.

As illustrated in FIG. 3, the signal transmission and averaging process between the first speed controller and the second speed controller are explained as follows by simplifying signal transmission and reception without considering domain changes in the aforementioned Equations.

The first speed controller 163 uses a signal Y1 to calculate a current command value, and the second speed controller 173 uses a signal Y2 to calculate a current command value.

In this case, the first speed controller 163 receives the signal Y2 of the second speed controller 173, averages it with the signal Y1, and calculates a current command value using a final signal Y1. The second speed controller 173 receives the signal Y1 of the first speed controller 163, averages it with the signal Y2, and calculates a current command value using a final signal Y2.

The first speed controller 163 receives the initial value Y11 of the signal Y1 (S31), and the second speed controller 173 receives the initial value Y21 of the signal Y2 (S41).

The first speed controller 163 receives the signal Y2 from the second speed controller, in which case the signal Y2 is the initial value Y21 (S42).

The first speed controller 163 calculates A11, which is the average of Y1 and Y2, namely, the average of Y11 and Y21, and computes the average of Y11 and A11 to calculate a signal Y12 (S32).

The first speed controller 163 transmits the signal Y12 as Y1 to the second speed controller 173 (S33).

Meanwhile, the second speed controller 173 receives the signal Y1, namely, Y12, from the first speed controller 163.

The second speed controller 173 calculates A21, which is the average of Y1 and Y2, namely, the average of Y12 and Y21, and computes the average of Y21 and A21 to calculate a signal Y22 (S43).

The second speed controller 173 transmits the signal Y22 as Y2 to the first speed controller (S44).

The first speed controller 163 receives Y22, computes the average A12 with Y12, adds A12 and Y12, and calculates the average value Y13 divided by 2 (S34).

The first speed controller 163 transmits the signal Y1 as Y13 to the second speed controller 173 (S35).

The first speed controller 163 and the second speed controller 173 repeat this process (S36 to S48).

The first speed controller 163 and the second speed controller 173 calculate the current command values using the signals Y1 and Y2 calculated every hour and apply them to the current controllers.

For example, the first speed controller 163 calculates the current command value using the signal Y12 at the first time and calculates the current command value using the signal Y13 at the second time.

Figure 4:
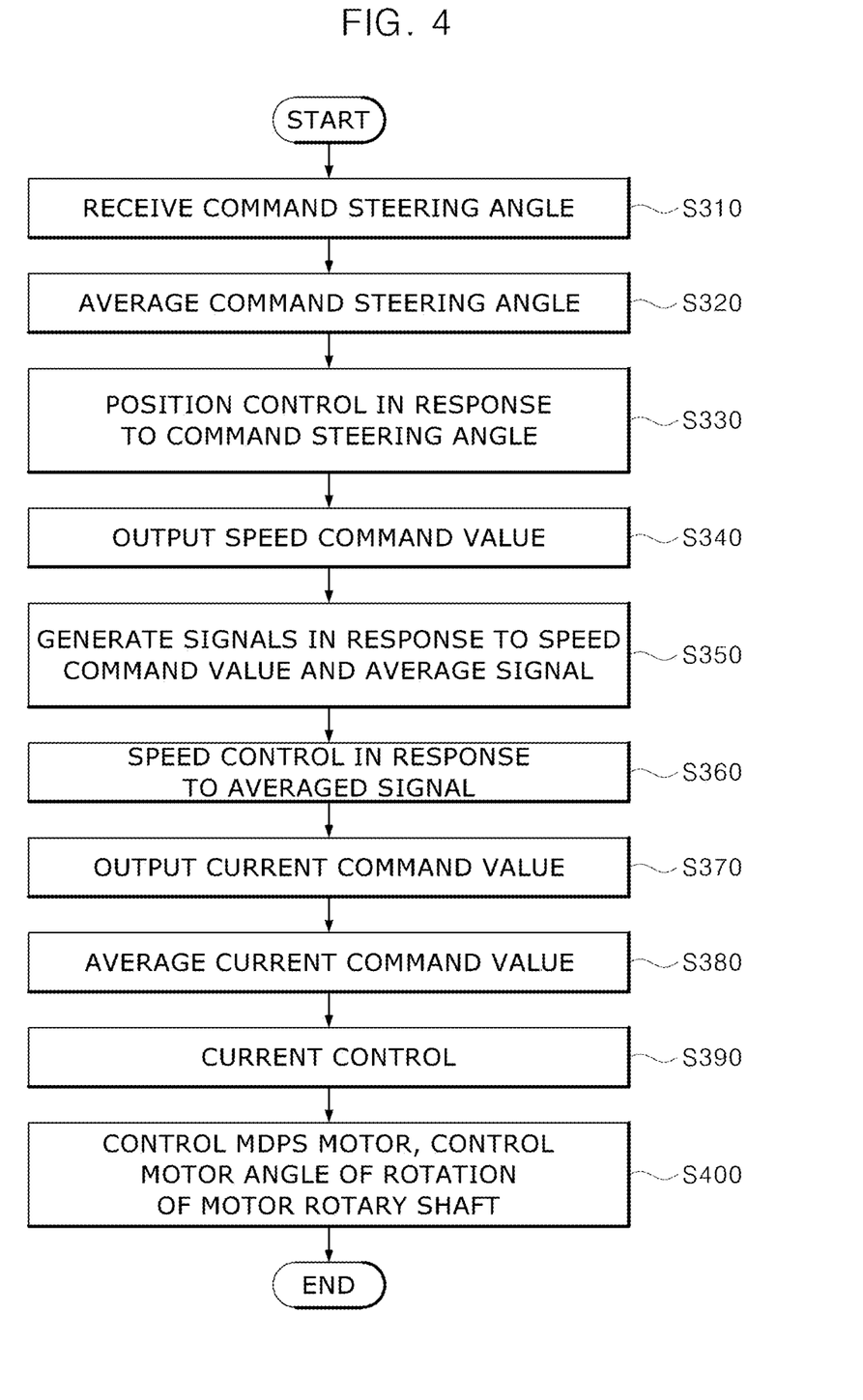
FIG. 4 is a flowchart illustrating a method of controlling the power steering control system with redundant structure according to the embodiment of the present disclosure.

FIG. 4 is a flowchart illustrating a method of controlling the power steering control system with redundant structure according to the embodiment of the present disclosure.

As illustrated in FIG. 4, the first steering device 160 and the second steering device 170 receive command steering angles of the autonomous driving unit 150 (S310).

The position controllers of the first steering device 160 and the second steering device 170 average the command steering angles (S320).

The position controllers 162 and 172 perform position control in response to the command steering angles (S330) and output speed command values (S340).

The speed controllers 163 and 173 generate signals for speed control in response to the speed command values applied from the position controllers, and transmit the signals for speed control to each other to average them (S350).

The speed controllers 163 and 173 perform speed control in response to the averaged speed command value (S360), and output current command values (S370).

The current controllers 165 and 175 receive and average the current command values (S380).

The current controllers 165 and 175 output current control signals for the MDPS motor in response to the averaged current command value (S390).

The current control signals of the respective first and second steering devices 160 and 170 are applied to the rotary shaft of the steering motor (MDPS motor) through the motor windings, so that the rotary shaft of the motor rotates to control the angle of rotation (S400).

In this case, the averaging process of the first steering device 160 and the second steering device 170 transmits signals to each other as described above in FIG. 3 to calculate the average, and recalculates the average of the calculated average and the control signal to use the same for control.

The first steering device 160 and the second steering device 170 repeat transmitting the calculated average value again.

Figure 5:
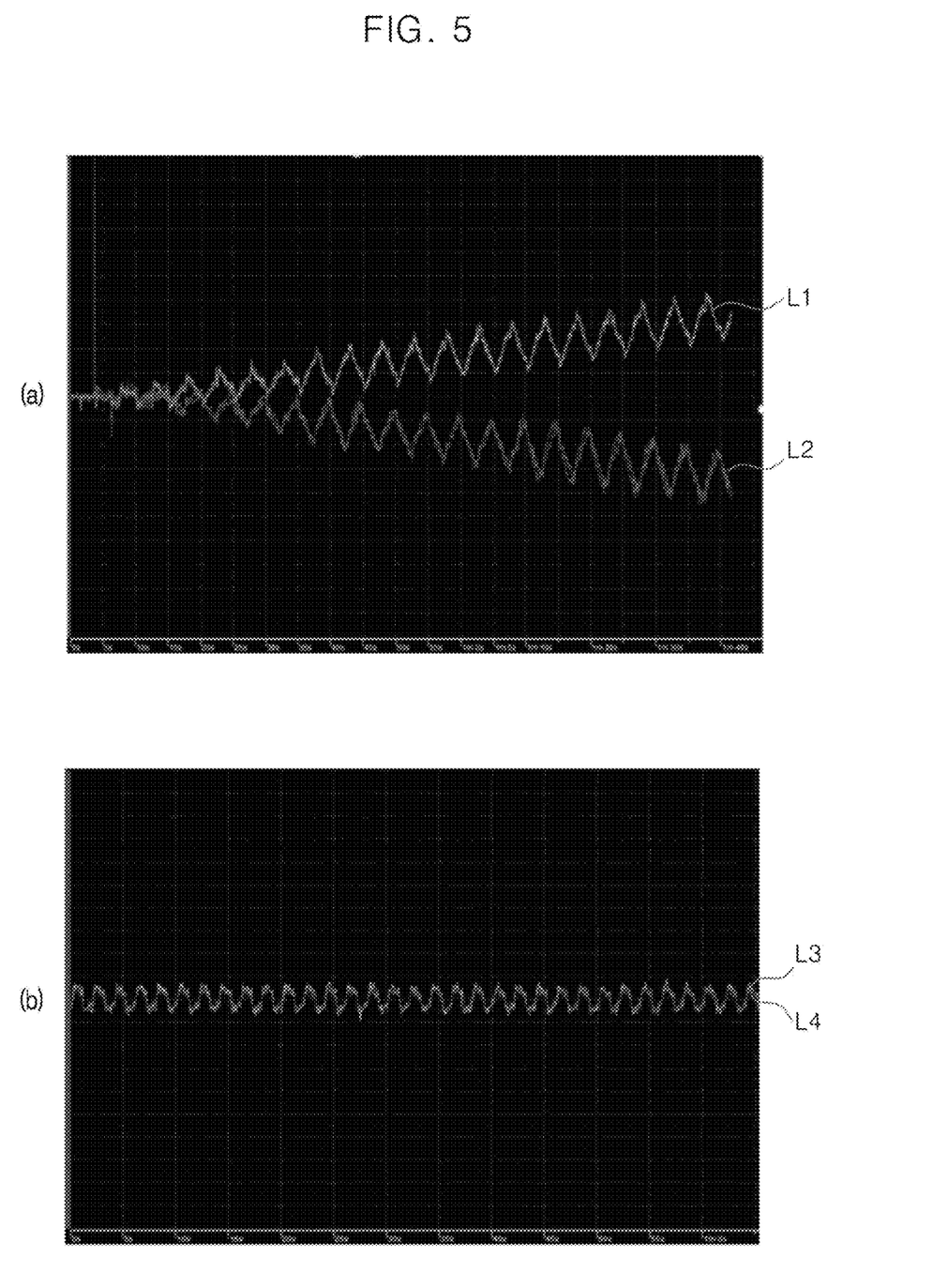
FIG. 5 is a view illustrating control signals of the power steering control system with redundant structure according to the embodiment of the present disclosure.

FIG. 5 is a view illustrating control signals of the power steering control system with redundant structure according to the embodiment of the present disclosure.

The first steering device 160 and the second steering device 170 perform control independently. In this case, if an error occurs in the control signals generated by the first steering device 160 and the second steering device 170 and the error accumulates over time, as illustrated in FIG. 5(*a*), as the cumulative error increases, the two signals L1 and L2 show a tendency to diverge due to the cumulative error.

As such, if the cumulative error increases, the difference in control signals increases, causing an error in motor control.

Meanwhile, if the first steering device 160 and the second steering device 170 perform control independently and control the motor using the averaged signal by transmitting and receiving signals with respect to each other as in the present disclosure, as illustrated in FIG. 5(*b*), the current signals L3 and L4 for motor control may be kept constant within the error range.

Accordingly, the current signals for motor control are applied to the motor rotary shaft, so that the steering motor operates.

Therefore, according to the power steering control system with redundant structure and the control method thereof of the present disclosure, it is possible to eliminate control imbalance caused by the accumulation of errors and accurately and stably control the motor, thereby improving the driving stability of the vehicle.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the technical protection scope of the present disclosure should be defined by the following claims.

What is claimed is:

1. A power steering control system with redundant structure, the system comprising:
    a first position controller configured to output a first speed command value in response to a command steering angle;
    a first speed controller operatively connected to the first position controller and configured to output a first current command value in response to the first speed command value received from the first position controller;
    a first current controller operatively connected to the first speed controller and configured to output a first current control signal for controlling a steering motor in response to the first current command value received from the first speed controller;
    a second position controller configured to output a second speed command value in response to a command steering angle;
    a second speed controller operatively connected to the second position controller and configured to output a second current command value in response to the second speed command value received from the second position controller and;
    a second current controller operatively connected to the second speed controller and configured to output a second current control signal for controlling the steering motor in response to the second current command value received from the second speed controller; and
    the steering motor operatively connected to the first current controller and the second current controller and configured to control a driving direction of an object to which the steering motor is mounted, by driving in response to the first current control signal and the second current control signal,
    wherein the first position controller and the second position controller are configured to transmit the command steering angles to each other to average the command steering angles, and then determine the first speed command value and the second speed command value, respectively.

2. The power steering control system according to claim 1, wherein the first current controller and the second current controller are configured to transmit the first current command value and the second current command value to each other to average the first current command value and the second current command value, and then determine the first current control signal and the second current control signal.

3. The power steering control system according to claim 1, wherein the first speed controller and the second speed controller determine respective signals for speed control in response to the first speed command value and the second speed command value according to an averaging algorithm, and then to transmit the signals for speed control to each other to average the signals and control a cumulative error.

4. The power steering control system according to claim 1, wherein the first speed controller and the second speed controller are configured to transmit signals for speed control to each other to average the signals to be reflected in speed control, and transmit the averaged signals again.

5. The power steering control system according to claim 4, wherein the first speed controller and the second speed controller are based on a sampling period, a difference between a command speed and a feedback speed, and an integral control gain, and output the signals for speed control by multiplying the difference between the command speed and the feedback speed by the sampling period, multiplying the multiplied result by the integral control gain, and then accumulating the same.

6. The power steering control system according to claim 1, wherein the first speed controller is configured to:
    determine a first signal for speed control in response to the first speed command value and transmit the first signal to the second speed controller;
    perform speed control by computing a first average value, which is an average value of the first signal and a second signal received from the second speed controller, and computing an average of the first signal and the first average value to determine a third signal; and
    transmit the third signal to the second speed controller.

7. The power steering control system according to claim 6, wherein the second speed controller is configured to:
    determine the second signal for speed control in response to the second speed command value and transmit the second signal to the first speed controller;
    perform speed control by computing a second average value, which is an average value of the second signal and the third signal received from the first speed controller, and computing an average of the second signal and the second average value to determine a fourth signal; and
    transmit the fourth signal to the first speed controller.

8. A method of controlling a power steering control system with redundant structure, the method comprising:
    outputting, by a first position controller of the power steering control system, a first speed command value in response to a command steering angle received by the first position controller;
    outputting, by a second position controller of the power steering control system, a second speed command value in response to a command steering angle received by the second position controller;
    outputting, by a first speed controller operatively connected to the first position controller, a first current command value in response to the first speed command value received by the first speed controller;
    outputting, by a second speed controller operatively connected to the second position controller, a second current command value in response to the second speed command value received by the second speed controller;
    outputting, by a first current controller operatively connected to the first speed controller, a first current control signal for controlling a steering motor in response to the first current command value received by the first current controller;
    outputting, by a second current controller operatively connected to the second speed controller, a second current control signal for controlling the steering motor in response to the second current command value received by the second current controller;
    controlling a driving direction of an object to which the steering motor is mounted, by applying the first current control signal and the second current control signal to the steering motor; and
    transmitting the received command steering angles to each other to average the received command steering angles by the first position controller and the second position controller, wherein the first and second speed command values are calculated in response to the averaged command steering angles.

9. The method according to claim 8, further comprising:
transmitting the first current command value and the second current command value to each other by the first current controller and the second current controller; and
calculating an average of the first current command value and the second current command value by the first current controller and the second current controller,
wherein the first and second current control signals are output in response to the averaged first and second current command values.

10. The method according to claim 8, wherein the first speed controller is configured to:
generate a first signal for speed control in response to the first speed command value received from the first position controller;
receive a second signal for speed control from the second speed controller;
determine a first average value by computing an average of the first signal and the second signal;
determine a third signal by computing an average of the first signal and the first average value;
transmit the third signal to the second speed controller; and
perform speed control in response to the third signal and output the first current command value.

11. The method according to claim 10, wherein the second speed controller is configured to:
generate the second signal for speed control in response to the second speed command value;
transmit the second signal to the first speed controller;
receive the third signal from the first speed controller;
perform speed control by computing a second average value, which is an average value of the second signal and the third signal, and computing an average of the second signal and the second average value to determine a fourth signal;
transmit the fourth signal to the first speed controller; and
perform speed control in response to the fourth signal and output the second current command value.

* * * * *